United States Patent
Kebbede et al.

(10) Patent No.: US 8,163,434 B2
(45) Date of Patent: Apr. 24, 2012

(54) BARRIER COATINGS FOR INTERCONNECTS; RELATED DEVICES, AND METHODS OF FORMING

(75) Inventors: Anteneh Kebbede, Niskayuna, NY (US); Gabriel Kwadwo Ofori-Okai, Niskayuna, NY (US); Frederic Joseph Klug, Schenectady, NY (US); Matthew Joseph Alinger, Albany, NY (US); Daniel Joseph Lewis, Delmar, NY (US)

(73) Assignee: General Electric Company, Niskayuna, NY (US)

( * ) Notice: Subject to any disclaimer, the term of this patent is extended or adjusted under 35 U.S.C. 154(b) by 843 days.

(21) Appl. No.: 12/199,937

(22) Filed: Aug. 28, 2008

(65) Prior Publication Data
US 2010/0055533 A1 Mar. 4, 2010

(51) Int. Cl.
*H01M 8/02* (2006.01)
(52) U.S. Cl. .......................... 429/468; 429/535; 427/115
(58) Field of Classification Search .................. 429/468, 429/535; 427/115
See application file for complete search history.

(56) References Cited

U.S. PATENT DOCUMENTS

| 5,942,349 | A | 8/1999 | Badwal et al. |
|---|---|---|---|
| 6,054,231 | A * | 4/2000 | Virkar et al. ............... 429/468 X |
| 6,074,772 | A | 6/2000 | Hofer et al. |
| 6,896,992 | B2 * | 5/2005 | Kearl ......................... 429/488 X |
| 6,946,213 | B2 | 9/2005 | Seabaugh et al. |
| 7,365,007 | B2 | 4/2008 | Sir |
| 2003/0027033 | A1 | 2/2003 | Seabaugh et al. |
| 2006/0051643 | A1 | 3/2006 | Sarkar et al. |

FOREIGN PATENT DOCUMENTS

| EP | 0815607 B1 | 5/2004 |
|---|---|---|
| WO | 2007075867 A2 | 7/2007 |

OTHER PUBLICATIONS

Yngve Larringz and Truls Norby; "Spinel and Perovskite Functional Layers Between Plansee Metallic Interconnect (Cr-5 wt % Fe-1 wt % Y2O3) and Ceramic (La0.85Sr0.15)0.91MnO3 Cathode Materials for Solid Oxide Fuel Cells"; Journal of the Electrochemical Society, 147 (9) 3251-3256 (2000).

* cited by examiner

*Primary Examiner* — Stephen J. Kalafut
(74) *Attorney, Agent, or Firm* — Francis T. Coppa (57) ABSTRACT

A method of preparing a solid oxide fuel cell is described herein, as well as the fuel cell itself. The method comprises forming a cathode layer comprising a strontium composition on a ceramic electrolyte layer; and forming a barrier layer between the cathode layer and an overlying interconnect structure comprising chromium, so as to substantially prevent the formation of strontium chromate.

30 Claims, 7 Drawing Sheets

BARRIER COATINGS FOR INTERCONNECTS; RELATED DEVICES, AND METHODS OF FORMING

BACKGROUND OF THE INVENTION

The invention is generally related to fuel cells. More particularly, the invention is related to barrier coatings for interconnects, e.g., interconnects for solid oxide fuel cells. The invention is also related to a method of forming barrier coatings for interconnects, and devices made therefrom.

Chromium (Cr) containing electrical conductors such as ferritic stainless steels are widely used as interconnect (IC) materials in solid oxide fuel cells (SOFCs), because of their excellent oxidation resistance. These materials have the advantage of typically forming a thin Cr-rich oxide scale that protects the electrical conductors from rapid oxidation. The fuel cells also include a cathode; and the cathode materials often include strontium-based compositions such as lanthanum strontium ferrite, lanthanum strontium managanite, and lanthanum strontium cobalt ferrite.

One of the most commonly observed problems in solid oxide fuel cells utilizing these materials is the decrease in the performance of the cell on continuous usage. One of the reasons for degradation of performance is Cr-poisoning of the cathode. Cr from the oxide scale is known to migrate into the cathode and become deposited on active electrochemical sites, where reaction between oxygen, the cathode, and the electrolyte would normally take place. This type of reaction can degrade the performance of the device. Another cause of performance degradation in solid oxide fuel cells is the formation of low conductivity strontium chromate at the interface between the interconnect and the cathode layers. Strontium chromate forms as a result of the reaction of chromium, from the interconnect material, with strontium, which is depleted from the cathode layer. The thickness of the formed strontium chromate layer can increase during the prolonged or intermittent operation of the solid oxide fuel cell, and thereby degrade the performance of the device.

Therefore, it is desirable to reduce or eliminate at least some of the degradation mechanisms discussed above, so as to provide solid oxide fuel cells with better performance capability and improved life cycles. It would also be desirable to develop methods to fabricate solid oxide fuel cells having better performance.

BRIEF DESCRIPTION OF THE INVENTION

The present invention meets these and other needs by providing a barrier coating between a cathode layer and an interconnect, which is capable of substantially preventing the formation of strontium chromate.

One embodiment of the invention is a method of preparing a solid oxide fuel cell. The method comprises forming a cathode layer comprising a strontium composition on a ceramic electrolyte layer; and forming a barrier layer between the cathode layer and an overlying interconnect structure comprising chromium, so as to substantially prevent the formation of strontium chromate.

Another embodiment is a solid oxide fuel cell. The solid oxide fuel cell is formed by a method comprising forming a cathode layer comprising a strontium composition on a ceramic electrolyte layer; and forming a barrier layer between the cathode layer and an overlying interconnect structure comprising chromium, so as to substantially prevent the formation of strontium chromate.

These and other features, aspects, and advantages of the present invention will become better understood when the following detailed description is read with reference to the accompanying drawings, in which like characters represent like parts throughout the drawing.

DETAILED DESCRIPTION OF THE INVENTION

In the following description, like reference characters designate like or corresponding parts throughout the several views shown in the figures. It is also understood that terms such as "top", "bottom", "outward", "inward", "first", "second", and the like are words of convenience, and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group. Moreover, the suffix "(s)" as used herein is usually intended to include both the singular and the plural of the term that it modifies, thereby including one or more of that term. (For example, the term "layer" may sometimes include one or more layers).

Figure 1:
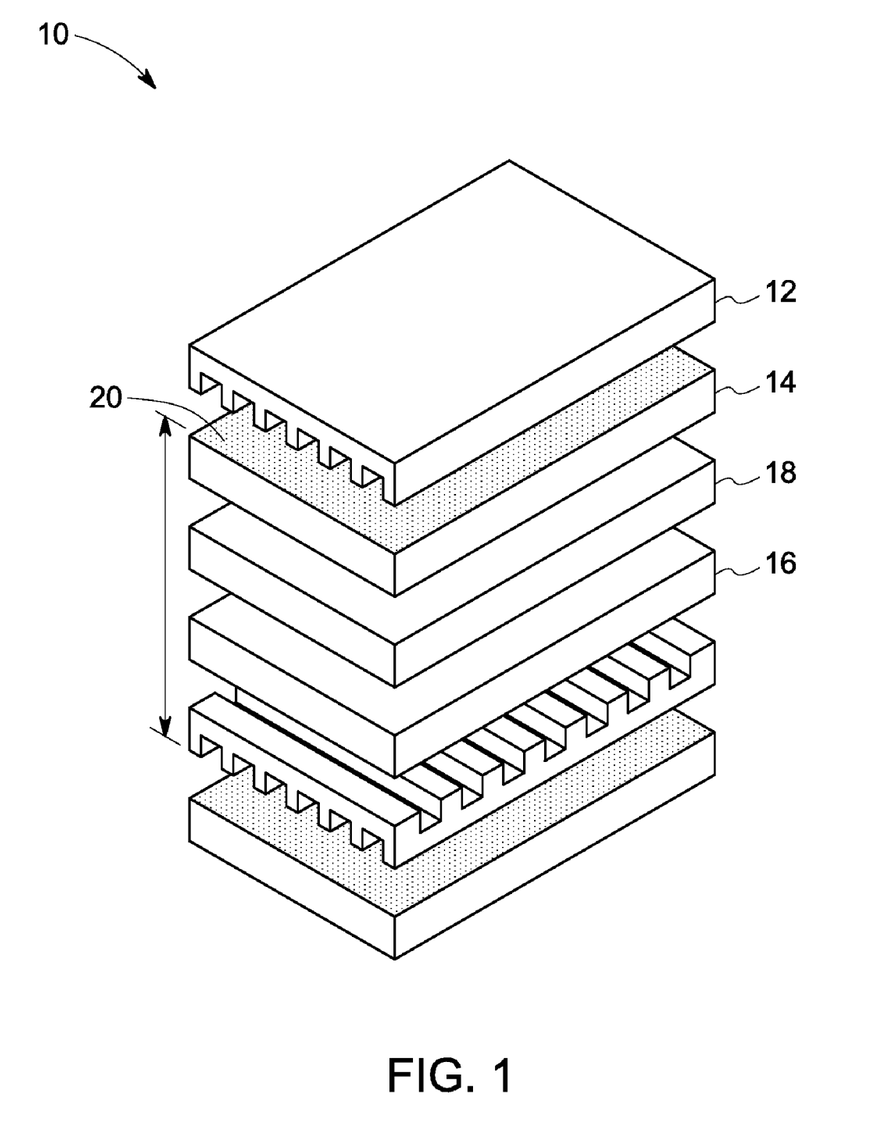
FIG. 1 is a schematic view of a solid oxide fuel cell comprising a barrier layer, according to one embodiment of the invention.

FIG. 1 shows an exemplary planar fuel cell 10 comprising interconnect ("interconnect structure") 12, and a pair of electrodes—a cathode layer 14 and an anode layer 16, separated by a ceramic electrolyte 18. The barrier layer 20 is formed between the interconnect structure and the cathode layer. The configuration depicted in the figure can also be modified in several ways, e.g., with the anode layer above the electrolyte, and the cathode layer below the electrolyte. Those skilled in the art understand that fuel cells may operate horizontally, vertically, or in any orientation.

Figure 2:
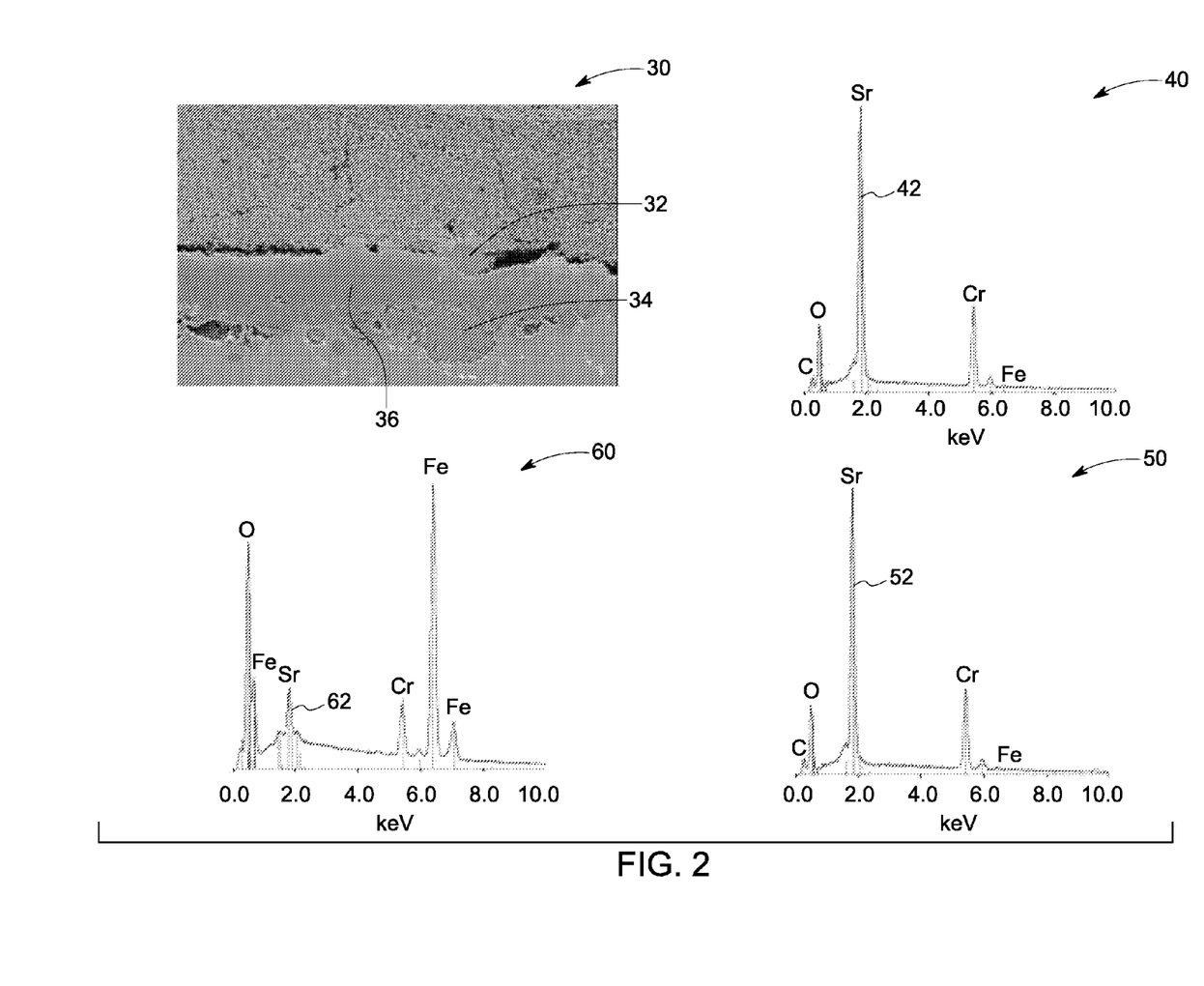
FIG. 2 is a scanning electron micrograph (SEM), and the corresponding Electron dispersive spectroscopy (EDS) depiction of some sites within a solid oxide fuel cell.

FIG. 2 represents a scanning electron micrograph 30 of a part of an SOFC cell containing a metallic interconnect and a bond layer, with an intervening oxide scale layer. The figure also depicts Energy Dispersive Spectroscopy (EDS) analyses results 40, 50, and 60, which were conducted on the regions 32, 34, and 36, respectively. The region 32 is a "pocket" of material that is formed at the interface between the oxide scale and the bond layer. The related EDS spectra 40 depicts the qualitative atomic percentages of different elements present in the region 32. The presence of a very high amount of strontium in region 32 is evident from the intensity of peak 42. The other elements found in the EDS of this region were chromium and oxygen. The region 34 is a pocket of material that is formed at the interface between metallic interconnect and the oxide scale. The qualitative atomic percentages of strontium, chromium, and oxygen elements present in the region 34 are depicted in the related EDS spectra 50. The high intensity of peak 52 indicates the presence of high amounts of strontium in region 34. Region 36 lies within the oxide scale, and corresponds to the EDS spectra depicted in graph 60. The elements present in region 36 are iron, oxygen, chromium and strontium. As seen from the EDS spectra 60, and by way of the comparison of strontium peak 62 with other peaks, it is evident that some amount of strontium is present in the oxide regions also, even though it may not be a major component in the oxide scale. Hence, it is evident from FIG. 2 that strontium ions from the bond layer or cathode migrate to the boundaries of the layers, and further into the oxide scale.

Figure 3:
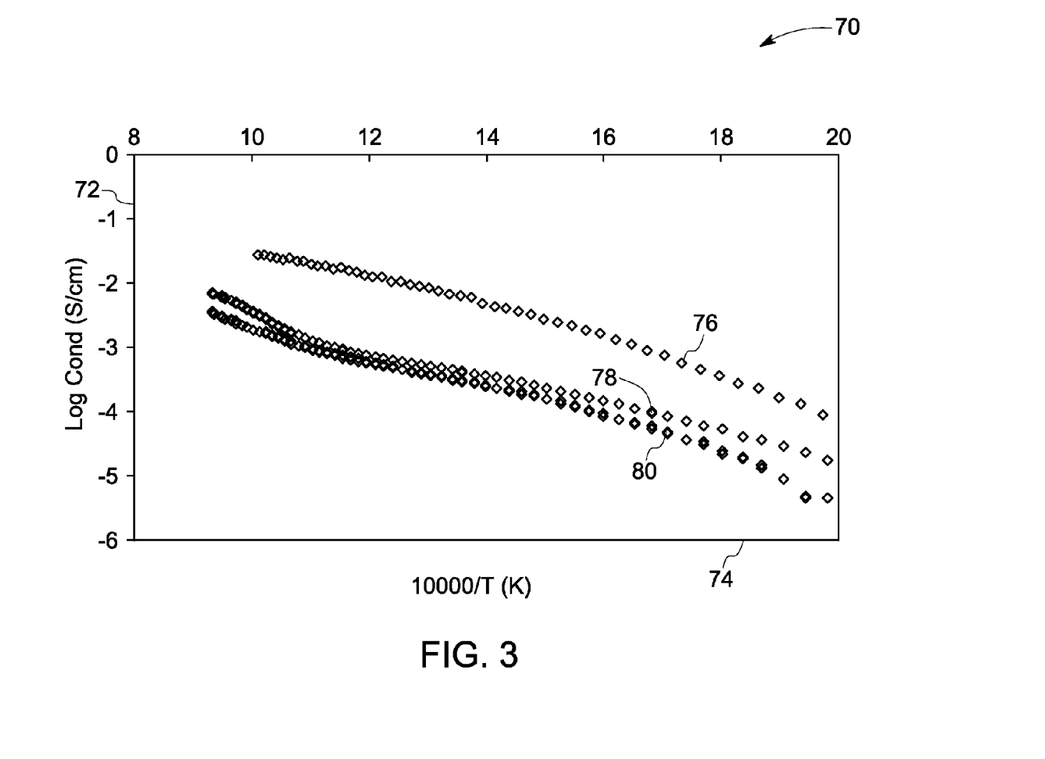
FIG. 3 is a graphical comparison of the conductivities of strontium chromate and chromium oxide

FIG. 3 is a graphical representation 70 of the conductivities of chromium oxide and strontium chromate ($SrCrO_4$). In this graph, the logarithm of electrical conductivity represented by Y axis 72 is drawn, versus the temperature represented by 10000/T in the X axis 74. The curve 76 is the representation of the conductivity of a commercial chromium oxide. Curve 78 represents the conductivity of $SrCrO_4$ obtained by sintering at 870° C. Curve 80 represents the conductivity of $SrCrO_4$ obtained by sintering at 800° C. From the graph, it is evident that chromium oxide has about an order of magnitude higher conductivity than $SrCrO_4$. In other words, the $SrCrO_4$ is about 10 times more electrically resistive than the chromium oxide. Hence, the formation of strontium chromate is more detrimental than chromium oxide for the functioning of SOFC, and the measures taken to control formation of strontium chromate will enhance performance of the fuel cells.

Figure 4:
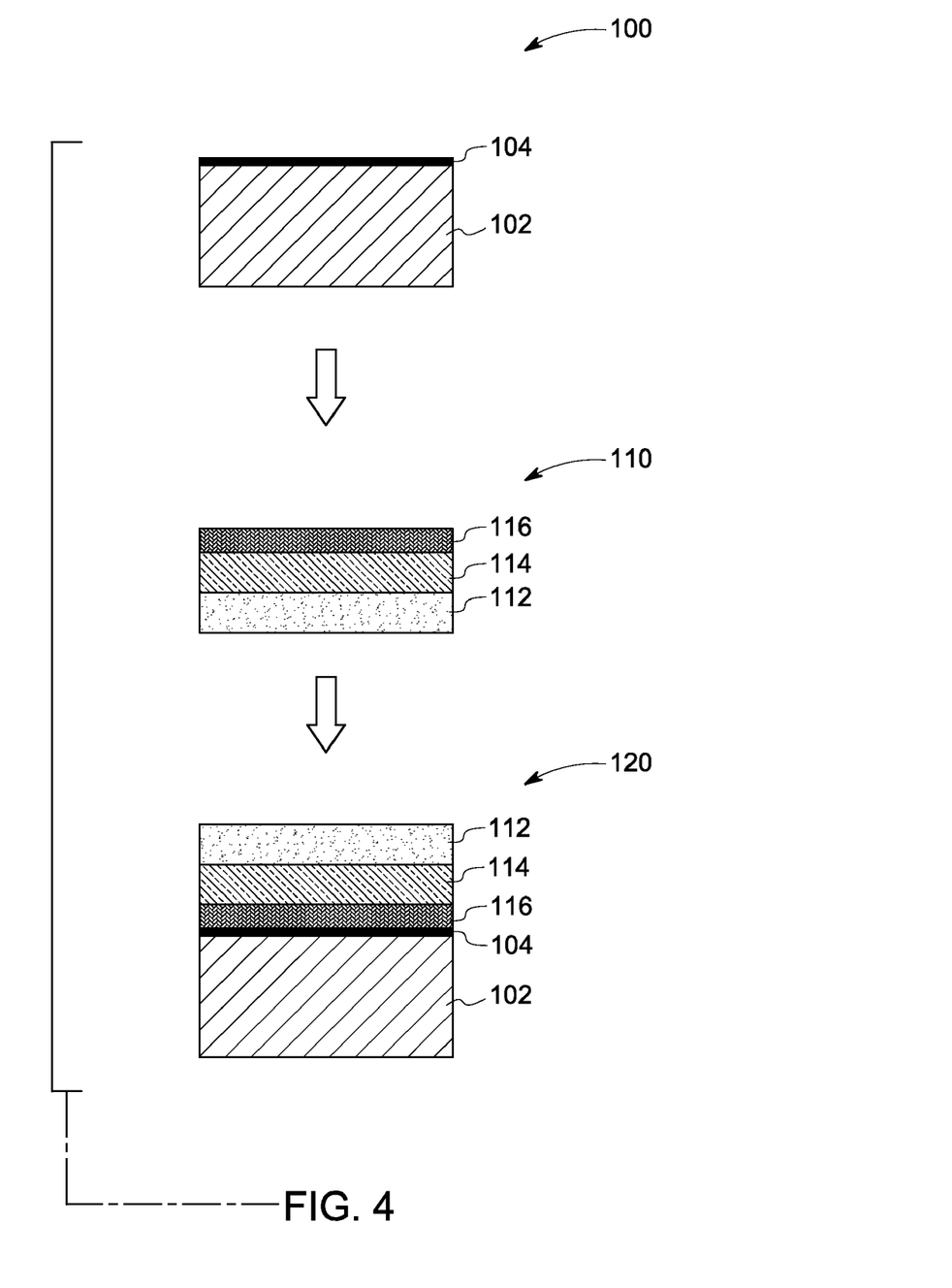
FIG. 4 is a schematic view of the preparation of a solid oxide fuel cell, including the deposition of a barrier layer, according to one embodiment of the invention.

FIG. 4 shows a schematic representation of the barrier layer deposition in a solid oxide fuel cell, according to one embodiment of the invention. Here, a part of the cell structure 100 was formed by providing the interconnect 102 with a barrier layer 104. Separately, another part of the cell structure 110 was formed by providing an anode 112—electrolyte 114 bilayer with cathode layer 116. In a process 120, two parts 100 and 110 of the cell structure were joined together to make an SOFC cell, such that the cathode layer 116 is in contact with the barrier layer 104.

Figure 5:
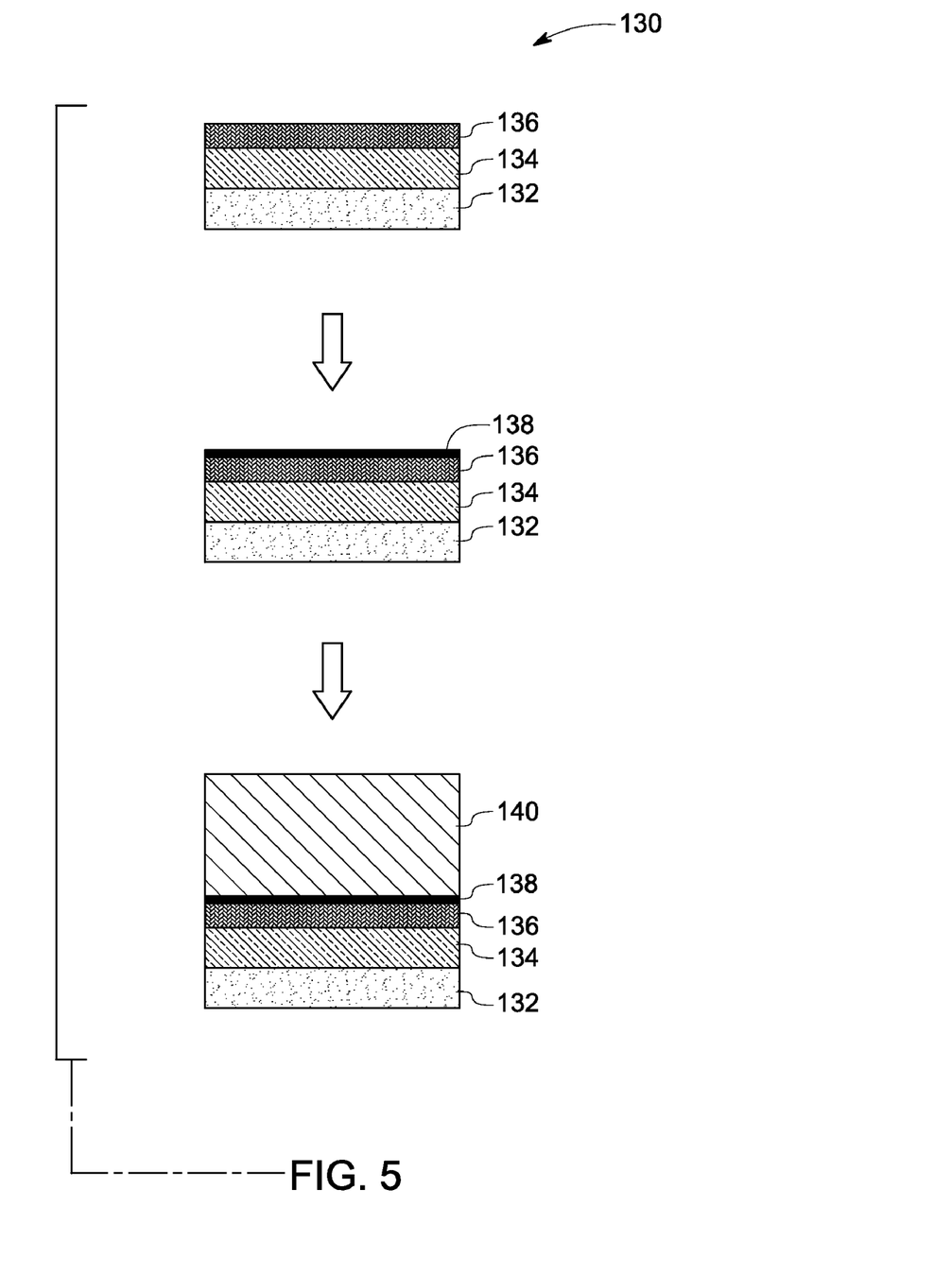
FIG. 5 is a schematic view of the preparation of a solid oxide fuel cell, including the deposition of a barrier layer, according to another embodiment of the invention.

FIG. 5 is a schematic representation of the barrier layer deposition in a solid oxide fuel cell, according to another embodiment of the invention. Here, the process 130 involves providing an anode 132—electrolyte 134 bilayer with cathode layer 136. A barrier layer 138 was deposited over the cathode layer 136, and then an interconnect 140 was attached to the barrier layer 138.

While FIG. 4 and FIG. 5 are depicting two possibilities of forming a barrier layer in between the cathode layer and interconnect, they are not intended to limit the invention. One skilled in the art would appreciate that there can be many other ways of forming the barrier layer, e.g., in terms of layer pre-formations and pre-attachments.

As mentioned briefly above, one embodiment of the invention is a method of preparing a solid oxide fuel cell. The method comprises forming a cathode layer comprising a strontium composition on a ceramic electrolyte layer, which itself is disposed over an anode. The anode and cathode of the adjacent cells are connected through a chromium-comprising interconnect structure in such a way that there is a barrier layer disposed between the cathode layer and the interconnect structure. The method comprises forming the barrier layer between the cathode layer and the overlying interconnect structure comprising chromium, so as to substantially prevent the formation of strontium chromate. As used here, the "substantial prevention" of the formation of strontium chromate is meant to describe a prevention level which ensures optimum electrical characteristics and fuel efficiency over an extended period of operation for the fuel cell. As a general illustration, the amount of strontium chromate that is formed should be low enough to increase the area specific resistance (ASR) of the fuel cell by no more than about 20%, as compared to a fuel cell in which no strontium chromate was formed. In some preferred embodiments, the amount of strontium chromate which is formed is low enough to increase the ASR value by no more than about 10%.

A cathode layer having an 'overlying' interconnect structure is defined as the arrangement wherein the cathode layer and the interconnect structure are disposed in electrical communication with each other. The interconnect structure can be physically adjacent to the cathode layer, or can be spaced several layers apart from the cathode layer, as long as electrical connectivity is maintained.

The method of forming the barrier layer between the cathode layer and overlying interconnect structure comprising chromium can include the sequence of steps wherein either the cathode layer or the interconnect structure is constructed after the barrier layer is formed. For example, the barrier layer can be applied over the cathode, followed by placement of the interconnect. Alternatively, the barrier layer could be applied to the underside of the interconnect, which is then placed over the cathode. As yet another alternative, the barrier layer can be applied to both the underside of the interconnect and the top of the cathode, which are then later joined together.

The method of preparing a solid oxide fuel cell, wherein the described barrier layer is disposed between the cathode layer and the interconnect structure, is expected to substantially prevent the formation of strontium chromate in the solid oxide fuel cell.

The cathode layer may be deposited by any known process in the art. Some examples of suitable deposition processes include, but are not limited to, wet spray, thermal spray, physical vapor deposition, electron beam physical vapor deposition, chemical vapor deposition, tape casting, screen-printing, brush painting, and sol-gel coating. Some examples of suitable thermal spray processes include, but are not limited to, air plasma spraying (APS), flame spraying, and vacuum plasma spraying.

The cathode layer may be formed from conventional materials, such as a variety of electrically conductive (and in some cases ionically conductive) compounds. Usually, the cathode layer comprises a strontium containing composition. Non-limiting examples of cathode layer materials include strontium doped $LaMnO_3$, strontium doped $PrMnO_3$, strontium doped lanthanum ferrites, strontium doped lanthanum cobaltites, strontium doped lanthanum cobaltite ferrites, strontium ferrite, $SrFeCo_{0.5}O_x$, $SrCo_{0.8}Fe_{0.2}O_{3-\delta}$; $La_{0.8}Sr_{0.2}Co_{0.8}Ni_{0.2}O_{3-\delta}$; $La_{0.7}Sr_{0.3}Fe_{0.8}Ni_{0.2}O_{3-\delta}$; and combinations thereof. Composites of these materials may also be used. In certain embodiments, the ionic conductor comprises a material selected from the group consisting of yttria-stabilized zirconia, rare-earth-oxide-stabilized zirconia, scandia-stabilized zirconia, rare-earth doped ceria, alkaline-earth doped ceria, rare-earth oxide stabilized bismuth oxide, and various combinations of these compounds.

In general, for solid oxide fuel cell applications, ceramic electrolytes are used. These ceramic electrolytes generally have an ionic conductivity of at least about $10^{-3}$ S/cm, at the operating temperature of the device, and also have sufficiently low electronic conductivity. Examples of suitable ceramic materials include, but are not limited to, various forms of zirconia, ceria, hafnia, bismuth oxide, lanthanum gallate, thoria, and various combinations of these ceramics. In certain embodiments, the ceramic electrolyte comprises a material selected from the group consisting of yttria-stabilized zirconia, rare-earth-oxide-stabilized zirconia, scandia-stabilized zirconia, rare-earth doped ceria, alkaline-earth doped ceria, rare-earth oxide stabilized bismuth oxide, and various combinations of these compounds. In an exemplary embodiment, the ceramic electrolyte comprises yttria-stabilized zirconia. Doped zirconia is attractive because it exhibits substantially pure ionic conductivity over a wide range of oxygen partial pressure levels. In one embodiment, the ceramic electrolyte comprises a thermally sprayed (e.g., APS) yttria-stabilized zirconia. One skilled in the art would know how to choose an appropriate electrolyte, based on the requirements discussed herein.

The main purpose of the anode layer is to provide reaction sites for the electrochemical oxidation of a fuel introduced into the fuel cell. In addition, the anode material is desirably stable in the fuel-reducing environment, and has adequate electronic conductivity, surface area and catalytic activity for the fuel gas reaction under operating conditions. The anode material desirably has sufficient porosity to allow gas transport to the reaction sites. The anode layer may be made of any material having these properties, including but not limited to, noble metals, transition metals, cermets, ceramics and combinations thereof. Non-limiting examples of the anode layer material include nickel, nickel alloy, cobalt, Ni—YSZ cermet, Cu—YSZ cermet, Ni-Ceria cermet, or combinations thereof. In certain embodiments, the anode layer comprises a composite of more than one material.

The purpose of the interconnect structure between individual fuel cells, as well as at each end of a fuel cell stack and at each side of a single fuel cell, is to convey electrical current away from the fuel cell and/or between adjacent fuel cells, as well as conveying heat away from the fuel cell or cells. To this extent, an interconnect structure should have a relatively high electrical conductivity, which is preferably only electronic (i.e., as compared to ionic) or at least primarily electronic, to minimize voltage losses, with negligible contact resistance at the interconnect/electrode interface. It should also have a relatively high thermal conductivity to provide improved uniformity of heat distribution, and to lower thermal stresses.

The interconnect structure can be in a solid form, or in some other form. As an example, the structure can be formed in the shape of channels in the contact surfaces, which can decrease contact resistance and the like, and improve the cell performance. The interconnect structure generally comprises a metal or a cermet, wherein Cr is one of the elements of the composition. Along with Cr, there is usually present at least one other element selected from the group of Fe, C, Cu, Ni, Mn, Co, Ti, V, Mg, Li, Nb, W, and rare earth metals. A non-limiting example of an interconnect material includes a ferritic stainless steel material with at least about 13% of Cr.

In one embodiment of the present invention, the barrier layer can be situated between the cathode layer and interconnect structure. As alluded to above, the barrier layer functions to prevent or impede the migration of strontium and chromium across this layer. Although the inventors do not wish to be bound by any specific theory, it appears that the migration of elements can be prevented by way of various mechanisms. As an example, the coating can act as a getter for chromium, either by reacting with the chromium, or by trapping it to form a solid solution. Some combination of these mechanisms is also possible. In another situation, the barrier layer or any of the initial reaction products formed can simply act as a physical barrier to the migration of strontium and chromium. The barrier layer can also assist in limiting the formation of a chromium oxide scale, by limiting the air access to the interconnect surface. The barrier layer itself is expected to have a higher electrical conductivity than the chromium oxide scale, thereby reducing the overall cell resistance.

In view of these proposed mechanisms (and possibly others), it is expected that the increased density of the barrier layer increases the barrier layer functionality. The dense layer will be more efficient in preventing the migration of strontium and chromium. Depending on the methods adopted, and also on other conditions, the barrier layer density can be in different ranges.

Suitable barrier layer materials are selected based on several criteria, such as electrical conductivity, phase stability and suitable values for the coefficient of thermal expansion. The barrier layer is expected to have an increased electrical conductivity compared to the strontium chromate and the chromium oxide. The phase stability of the barrier layer material should be such that it can accommodate more chromium by one or more means of forming a solid solution, substitution, and reaction.

In one embodiment, the barrier layer materials are deposited in their expected compositional form. In another embodiment, the barrier layer material can be initially deposited in a different compositional form, and then converted into the required form by certain methods, such as oxidation or reaction with the adjacent layers. Processes such as heating in-situ (e.g., during normal fuel cell operation), or using an external heating source, can promote this conversion. For example, initially, the material can be deposited in a metallic form and later converted, by heating in an oxidizing atmosphere, to a metallic oxide form. These modifications in the deposition materials and methods can influence different properties of the barrier layer, including its physical and chemical properties. Moreover, choice of a deposition method and material can influence manufacturing techniques and manufacturing cost.

In some embodiments, the barrier layer comprises manganese, iron, cobalt or a combination of two or more of these elements, with or without oxygen and doping elements. In one specific embodiment, the barrier layer comprises a material having a spinel structure or "spinel composition". As used herein, the term "spinel composition" can include mixed spinels. In one embodiment, the spinel composition comprises Co—Co spinel, Mn—Mn spinel, Fe—Fe spinel, or a combination of two or more of these spinels (e.g., Mn—Mn spinel and Fe—Fe spinel). The spinel composition can comprise cobalt oxide, manganese oxide, iron oxide, or a combination of two or more of these oxides. The doping elements usually comprise Fe, Mn, Co, Cr, or a combination thereof. As used herein, the doping element is an element or combination of elements added in small quantities, to enhance the barrier layer properties.

The barrier layer discussed herein usually has a thickness in the range from about 5 microns to about 100 microns. In some specific embodiments, the barrier layer has a thickness in the range from about 10 microns to about 50 microns, while in other embodiments the thickness may be in the range from about 5 microns to about 25 microns. In another embodiment, the barrier layer has a thickness in the range from about 25 microns to about 75 microns.

The barrier layer discussed herein can be a single layer or a combination of multiple layers of a single material composition, or of multiple material compositions. Furthermore, as mentioned above, the barrier layer can be disposed on the interconnect structure, or on the cathode layer, or on both the interconnect and the cathode layer, which could be subsequently joined together.

The barrier layer can be deposited on the cathode layer or the interconnect structure by one or more techniques, such as dip coating, spin coating, spray coating, sputtering, and plating. The dip coating can include, for example, solution, sol-gel or slurry dip coating, or combinations thereof. The plating techniques can include the electroplating or electroless plating.

In one embodiment, the barrier layer can be disposed on the interconnect structure surface, and then the barrier layer-coated interconnect surface can be connected to the cathode layer, as depicted in FIG. 4.

In another embodiment, the barrier layer can be disposed on the cathode layer surface, and then the barrier layer-coated cathode surface can be connected to the interconnect structure surface, as depicted in FIG. 5. In yet another embodiment, a barrier layer coated interconnect structure surface can be connected to a barrier layer coated cathode layer.

Various methods can be used to connect the cathode layer and the interconnect structure, so as to obtain the structure in which the barrier layer is disposed between the cathode layer and the interconnect structure. One of the methods can involve depositing a wet bond layer material on the barrier layer coated interconnect structure or the cathode layer, and then joining them and drying the wet bond layer, to obtain a joined structure.

In certain embodiments, the bond layer, sometimes referred to as a "bond paste", is used between the interconnect structure and electrode layers to increase the performance of the cell. The bond layers typically function to provide a better electrical contact between the interconnect structure and electrodes, and can also enhance the physical integrity of the overall fuel cell. Hence, the bond layer can also be used as a joining means for the electrode layer and the interconnect structure. The bond layer situated between the interconnect structure and cathode layer is usually referred to as a "cathode bond layer". The composition of the cathode bond layer will depend on a variety of factors, such as the composition of the cathode itself; the electrical-conduction requirements of the fuel cell; the type of interconnect layer being employed, the required bonding strength of the material; the thermal requirements for the fuel cell; and the chemical compatibility of the materials in adjacent layers.

In many cases, the cathode bond layer is formed from a composition similar to that of the cathode itself. In some specific embodiments, the bond layer comprises one or more electronic-conducting ceramic materials, e.g., materials having a perovskite structure. Specific, non-limiting examples of suitable materials for the bond layer are as follows: $La_{1-x}Sr_xMnO_{3-\delta}$ (LSM), $La_{1-x}Sr_xCoO_{3-\delta}$ (LSC), $La_{1-x}Sr_xFeO_{3-\delta}$ (LSF), $La_{1-x}Sr_xCo_{1-y}Fe_yO_{3-\delta}$ (LSCF); $SrFe_{0.5}Co_{0.5}O_{3-\delta}$, $SrCo_{0.8}Fe_{0.2}O_{3-\delta}$; $La_{0.8}Sr_{0.2}Co_{0.8}Ni_{0.2}O_{3-\delta}$, $La_{0.7}Sr_{0.3}Fe_{0.8}Ni_{0.2}O_{3-\delta}$, $La_{1-x}M_xCrO_{3-\delta}$, where "M"=Mg, Ca, Sr, or combinations thereof; and $LaCr_{1-x}M^o{}_xO_{3-\delta}$, where "M$^o$"=Co, Ni, Al, Fe; lanthanum chromate ($LaCrO_3$); lanthanum manganate ($LaMnO_3$); or various combinations thereof. In the relevant formulae, the subscripts "x" and "y" may independently range from 0.99 to about 0.01. In some embodiments, the preferred cathode bond compositions comprise the LSC or LSM materials. (Those skilled in the art understand that the relative proportions of elements in LSC or LSM may vary to some degree).

The cathode bond layer material can be incorporated into the fuel cell structure by a number of conventional techniques. The material (in paste or slurry form) can be applied to the surface of the cathode layer; or to the surface of a cathode interconnect which faces the cathode surface. Alternatively, the cathode bond layer material can be deposited on both surfaces. The material can be applied by painting, screen printing, flowing, or other such techniques. Spray techniques could also be used in some instances, e.g., using a conventional wet spray process. In some embodiments, any or all of the techniques mentioned above can have certain post processing steps, including heat treatments. Those skilled in the art will be familiar with the most appropriate method of incorporating the cathode bond layer material, based in part on the other processes being employed to fabricate the fuel cell and fuel cell stack.

As noted above, the cathode bond layer, like the cathode layer, may include strontium. Therefore, additional improvement in fuel cell performance may occur if the reaction of strontium in the cathode bond layer with chromium in the interconnect structure is minimized or prevented, since the formation of strontium chromate is prevented in that instance as well.

In one embodiment, the cathode layer mentioned above can be deposited on the electrolyte layer overlying an anode layer. The bilayers of the anode layer and the electrolyte layer can be processed by known methods in the art, including, but not limited to, one or more methods such as tape calendering, tape casting, plasma spraying, slurry spraying, electrophoretic deposition, and electron beam physical vapor deposition. In one embodiment, the anode layer can be formed first by tape calendering, and the electrolyte layer can then be disposed over the anode layer by any method known in the art (including tape calendering). In another embodiment, the electrolyte layer can be formed first by tape calendering, and the anode layer can then be disposed over the electrolyte layer by the methods described above. In yet another embodiment, the anode layer and the electrolyte can be formed separately, and then attached together using any of the known processes. In still another embodiment, the anode layer and the electrolyte can be formed together as bilayers.

In one embodiment, a solid oxide fuel cell can be prepared by forming a barrier coating on an interconnect structure, wherein the interconnect structure is formed of a material which comprises chromium; forming a cathode layer which comprises strontium on an electrolyte layer which itself is disposed on an anode layer; and attaching the interconnect structure to the cathode layer, so that the barrier layer is disposed between the interconnect structure and the cathode layer, and is capable of preventing the formation of strontium chromate.

In another embodiment, the solid oxide fuel cell fabrication involves, first, forming a cathode layer comprising a strontium composition on a ceramic electrolyte layer, which itself is disposed over an anode. The anode and cathode of the adjacent cells are connected through a chromium-containing interconnect structure in such a way that there is a barrier layer disposed between the cathode layer and the interconnect structure. The method comprises forming the barrier layer between the cathode layer and the overlying interconnect structure containing chromium, so as to substantially prevent the formation of strontium chromate.

EXAMPLE

The following example serves to illustrate some of the features and advantages offered by the present invention, and is not intended to limit the invention thereto.

$Mn_3O_4$ (CAS 1317-37-7, FW228.81, −325 mesh) was obtained from Aldrich Chemical Company. A stock binder solution was prepared by dilution of V006 with α-terpineol in a ratio of 1.3 grams of V006 to each gram of additional α-terpineol. Different ratios of $Mn_3O_4$, the stock solution, and acetone were milled in a paint shaker with 100 g of zirconia media for 4 hours. The acetone was added to decrease drying time, which produced a rapid increase in the viscosity of the coating. This reduced the tendency of the coating to flow after the initial coating application. Some examples of the amounts (taken in grams) are shown in Table 1.

TABLE 1

Composition of $Mn_3O_4$ slurry

| Composition | Acetone | Stock Solution | $Mn_3O_4$ |
|---|---|---|---|
| 1 | 40 | 20 | 20 |
| 2 | 40 | 20 | 25 |
| 3 | 40 | 20 | 30 |
| 4 | 40 | 20 | 40 |
| 5 | 40 | 20 | 60 |

The interconnect was cleaned twice in an ultrasonic bath with detergent (Alconox™) and water, and then air-dried, prior to slurry coating. The $Mn_3O_4$ containing slurry was placed in a beaker, and stirred with a magnetic stirrer. Square flat plates (approximately 1 inch/2.54 cm dimension) were dipped into the slurry and dried in a 50° C. oven. The plates were weighed before dipping and after drying, and the coating thickness was estimated, based on the weight-gain of the interconnect. These experiments were also conducted to assess the ability of the coating to uniformly cover a 3-dimensional surface.

The firing was conducted in a 5% $H_2$/95% He flowing atmosphere followed by flowing air. During the reduction step, the $Mn_3O_4$ gets reduced to MnO, and in the flowing air, it is re-oxidized to $Mn_3O_4$. The typical temperature range used in the process is about 800° C. to 1000° C., with the overall time period varying between 12 hrs and 36 hrs, with longer time duration compensating for the lower temperature of firing. Before and after the firing step, the coating quality was evaluated, and macrographs were taken, using a binocular microscope.

The coating was found to be fairly uniform, and the coating thickness was sufficient to considerably reduce the migration of chromium and strontium.

Figure 6:
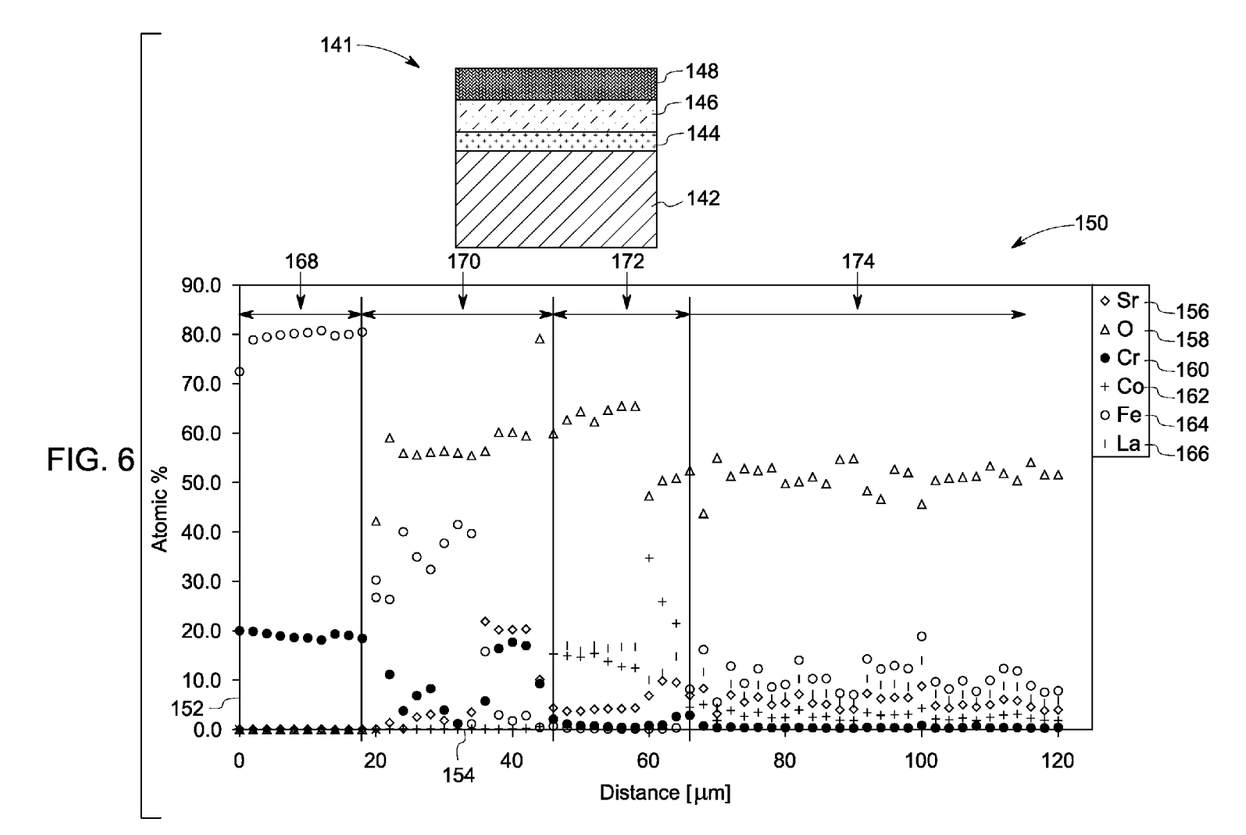
FIG. 6 is an electron microprobe analysis of some sections of an SOFC constructed without a barrier layer, representing the atomic percentages of constituent elements present across different layers.
Figure 7:
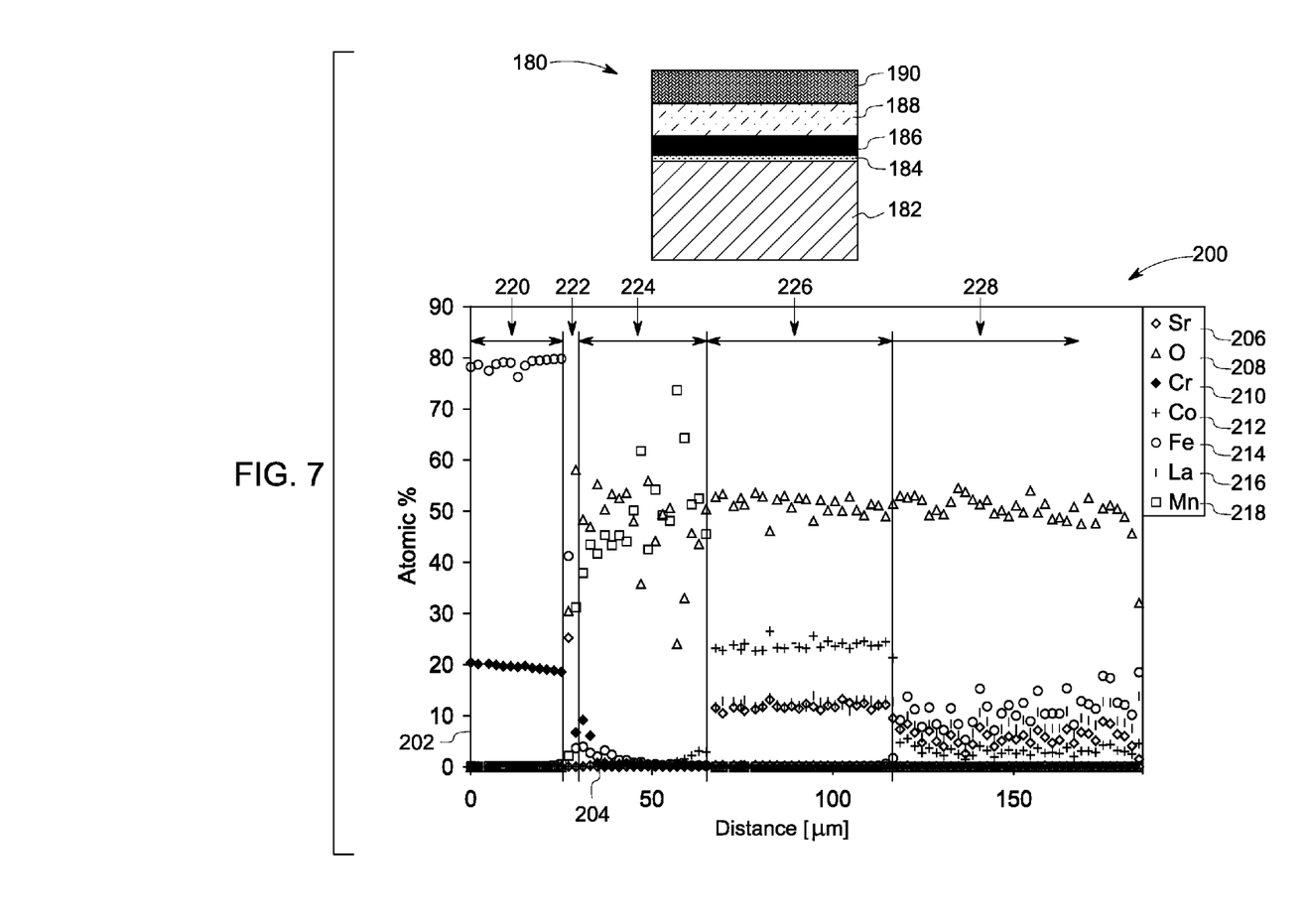
FIG. 7 is an electron microprobe analysis of some sections of an SOFC constructed with a barrier layer, according to one embodiment of the present invention.

FIG. 6 depicts an embodiment wherein the protective barrier layer is not used, while FIG. 7 depicts the embodiment wherein a protective barrier layer of $Mn_3O_4$ was provided, as explained in the above example. The comparison of these two figures will illustrate the effects of the barrier layer.

FIG. 6 represents a schematic 141 of a portion of an SOFC cell, and the corresponding electron microprobe analysis (EMPA) 150 through different layers of the cell parts. The schematic 141 contains a metallic interconnect 142, an oxide scale layer 144, a bond layer 146, and the cathode layer 148. The EMPA 150 is represented by plotting the atomic percentages of the constituent elements along Y axis 152, versus the actual distance from a point in the metallic interconnect, perpendicular through the different layers of the cell, depicted along the X axis 154. Different symbols in the graph signify elements as strontium 156, oxygen 158, chromium 160, cobalt 162, iron 164, and lanthanum 166. The parts of the graph corresponding to different layers in the cell are marked as metallic interconnect 168, oxide scale 170, bond layer 172, and cathode layer 174. From the graph, it is evident that the oxide layer formed is about 35 microns thick. Also, the relatively high amount of strontium in the oxide layer demonstrates that strontium has migrated from the bond layer or cathode to the oxide region, also resulting in Sr depletion in the bond layer. At the same time, the presence of chromium is also evident in the oxide layer, which might have led to the formation of strontium chromate. It should be noted that the analysis of elements inside of layer 170, near the interface with layer 172, showed elemental proportions of Sr, Cr, and O, which indicate the presence of the $SrCrO_4$ compound. However, the EMPA results elsewhere in layer 170 suggest that a mixture of phases, including $SrCrO_4$, might be present.

FIG. 7 represents a schematic 180 of a portion of an SOFC cell and the corresponding EMPA 200, through different layers of the cell parts. The schematic 180 contains a metallic interconnect 182, an oxide scale layer 184, an $Mn_3O_4$ protective coating (barrier layer) 186, a bond layer 188, and the cathode layer 190. The EMPA 200 is represented by plotting atomic percentages of the constituent elements along Y axis 202, versus the actual distance from a point in the metallic interconnect, perpendicular through the different layers of the cell, depicted along the X axis 204. Different symbols in the graph signify elements as strontium 206, oxygen 208, chromium 210, cobalt 212, iron 214, lanthanum 216, and manganese 218. The parts of the graph corresponding to different layers in the cell are marked as metallic interconnect 220, oxide scale 222, protective barrier layer 224, bond layer 226, and cathode layer 228. From the graph, it is seen that the oxide layer formed in this case is less than 3 microns thick. The amount of strontium in the protective barrier layer, oxide layer, or in any intersections of the metallic IC, oxide layer, or barrier layer, is nearly zero. This is a clear indication that the barrier coating has successfully blocked the migration of strontium from the bond layer and cathode.

While the invention has been described with reference to exemplary embodiments, it will be understood by those skilled in the art that various changes may be made, and equivalents may be substituted for elements thereof, without departing from the scope of the invention. In addition, many modifications may be made to adapt a particular situation or material to the teachings of the invention, without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of preparing a solid oxide fuel cell, comprising the steps of
    a) forming a cathode layer comprising a strontium composition on an electrolyte layer; and
    b) forming a barrier layer between the cathode layer and an overlying interconnect structure which comprises chromium, so as to substantially prevent the formation, of strontium chromate, wherein the barrier layer comprises a Co—Co spinel, Mn—Mn spinel, or Fe—Fe spinel.

2. The method of claim 1, wherein the cathode layer is formed on the electrolyte layer by a deposition method selected from the group consisting of thermal spraying, physical vapor deposition, electron beam physical vapor deposition, chemical vapor deposition, tape casting, screen-printing, and sol-gel coating.

3. The method of claim 2, wherein thermal spraying comprises a technique selected from the group consisting of wet spray, thermal spray, air plasma spraying (APS), flame spraying, and vacuum plasma spraying.

4. The method of claim 1, wherein the cathode layer is formed on the electrolyte layer by a technique which comprises tape casting.

5. The method of claim 1, wherein the barrier layer comprises a Co—Co spinel, or Fe—Fe spinel.

6. The method of claim 1, wherein the cathode comprises a material selected from the group consisting of strontium doped lanthanum manganite, strontium doped $PrMnO_3$, strontium doped lanthanum ferrite, strontium doped lanthanum cobaltite, strontium doped lanthanum cobaltite ferrite, strontium ferrite, and combinations thereof.

7. The method of claim 6, wherein the cathode comprises strontium-doped lanthanum manganite or strontium doped lanthanum ferrite.

8. The method of claim 1, wherein the interconnect structure comprises a metal or a cermet.

9. The method of claim 8, wherein the interconnect structure further comprises at least one other element selected from the group consisting of Fe, Cu, Ni, Mn, Co, Ti, V, Mg, Li, C, Nb, W, and rare earth metals.

10. The method of claim 8, wherein the interconnect structure comprises a ferritic stainless steel material.

11. The method of claim 10, wherein the interconnect structure comprises ferritic stainless steel having at least about 13 weight % of Cr.

12. The method of claim 11, wherein the interconnect structure comprises nickel, in addition to the chromium.

13. The method of claim 1, wherein the barrier layer is deposited in the form of an oxide.

14. The method of claim 1, wherein the barrier layer material is formed as a metal material, and is then oxidized to an oxide form of the metal.

15. The method of claim 1, wherein the barrier layer comprises cobalt, manganese, iron, or a combination of at least two of these elements.

16. The method of claim 1, wherein the barrier layer comprises a doping element selected from the group consisting of Fe, Mn, Co, Cr, or a combination thereof.

17. The method of claim 1, wherein the barrier layer has a thickness in the range of about 2 microns to about 100 microns.

18. The method of claim 17 wherein the barrier layer has a thickness in the range from about 5 microns to about 25 microns.

19. The method of claim 1, wherein the barrier layer comprises more than one layer.

20. The method of claim 1, wherein the barrier layer is disposed on the interconnect structure.

21. The method of claim 1, wherein the barrier layer is disposed on the cathode layer.

22. The method of claim 1, wherein forming the barrier layer between the cathode layer and the overlying interconnect structure comprises depositing the barrier layer by a method selected from the group consisting of dip coating, spin coating, spray coating, sputtering, electrophoretic deposition, plating, and combinations which include any of the foregoing.

23. The method of claim 1, wherein disposing the barrier layer between the cathode layer and the interconnect structure comprises depositing the barrier layer by electroplating or electroless plating.

24. The method of claim 1, wherein the barrier layer coated interconnect structure is attached to the cathode layer with a bond layer.

25. The method of claim 1, wherein a bond layer is formed over the barrier coating, in a position between the barrier coating and the cathode layer.

26. A method of preparing a solid oxide fuel cell, comprising the steps of:
(i) forming a barrier coating comprising Co—Co spinel, Mn—Mn spinel, or Fe—Fe spinel layer on an interconnect structure, wherein the interconnect structure is formed of a material which comprises chromium;
(ii) forming a cathode layer which comprises strontium, on an electrolyte layer which itself is disposed on an anode layer; and
(iii) attaching the interconnect structure to the cathode layer, so that the barrier layer is disposed between the interconnect structure and the cathode layer; and is capable of preventing the formation of strontium chromate.

27. The method of claim 26, wherein a bond layer is formed over the barrier coating, in a position between the barrier coating and the cathode layer.

28. The method of claim 26, comprising formation of bilayers of the anode layer and the electrolyte layer by at least one method selected from the group consisting of tape calendering, plasma spraying, slurry spraying, electrophoretic deposition, and electron beam physical vapor deposition.

29. A method of fabricating a solid oxide fuel cell which comprises a cathode comprising strontium; an anode; a ceramic electrolyte disposed between the cathode and the anode; and a cathode interconnect which overlies the cathode and which contains chromium; wherein the method comprises the step of forming a barrier layer comprising Co—Co spinel, Mn—Mn spinel, or Fe—Fe spinel between the cathode and the interconnect, so as to substantially prevent the formation of strontium chromate.

30. A solid oxide fuel cell produced by the method of claim 29.

* * * * *